(12) United States Patent
Toebes et al.

(10) Patent No.: US 7,792,989 B2
(45) Date of Patent: Sep. 7, 2010

(54) ARRANGEMENT FOR SELECTING A SERVER TO PROVIDE DISTRIBUTED SERVICES FROM AMONG MULTIPLE SERVERS BASED ON A LOCATION OF A CLIENT DEVICE

(75) Inventors: John Toebes, Cary, NC (US); Bryan C. Turner, Apex, NC (US); Douglas Jay Walker, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 937 days.

(21) Appl. No.: 11/110,863

(22) Filed: Apr. 21, 2005

(65) Prior Publication Data
US 2006/0116988 A1 Jun. 1, 2006

Related U.S. Application Data

(63) Continuation of application No. 11/081,694, filed on Mar. 17, 2005, which is a continuation-in-part of application No. 11/000,041, filed on Dec. 1, 2004.

(51) Int. Cl.
*G06F 15/173* (2006.01)
(52) U.S. Cl. ......................... 709/238; 709/223; 709/241
(58) Field of Classification Search ................ 709/227, 709/229, 238, 241, 223
See application file for complete search history.

(56) References Cited

U.S. PATENT DOCUMENTS

| | | | | |
|---|---|---|---|---|
| 5,519,704 A * | 5/1996 | Farinacci et al. ............. 370/402 |
| 6,085,234 A * | 7/2000 | Pitts et al. .................... 709/217 |
| 6,182,224 B1 | 1/2001 | Phillips et al. |
| 6,208,616 B1 * | 3/2001 | Mahalingam et al. ....... 370/216 |
| 6,226,684 B1 * | 5/2001 | Sung et al. ................... 709/238 |
| 6,292,813 B1 * | 9/2001 | Wolfe .......................... 715/205 |
| 6,304,913 B1 * | 10/2001 | Rune ........................... 709/241 |
| 6,470,389 B1 | 10/2002 | Chung et al. |
| 6,553,310 B1 * | 4/2003 | Lopke .......................... 701/213 |
| 6,598,071 B1 * | 7/2003 | Hayashi et al. .............. 709/203 |
| 6,606,643 B1 * | 8/2003 | Emens et al. ................ 709/203 |
| 6,643,704 B1 | 11/2003 | Timms et al. |
| 6,678,719 B1 | 1/2004 | Stimmel |

(Continued)

OTHER PUBLICATIONS

U.S. Appl. No. 11/053,954, filed Feb. 10, 2005, Toebes et al.

(Continued)

*Primary Examiner*—John Follansbee
*Assistant Examiner*—Anthony Mejia
(74) *Attorney, Agent, or Firm*—Leon R. Turkevich

(57) ABSTRACT

A selection resource executed within the network is configured for selecting from among a plurality of servers, distributed throughout the network at respective network-based server locations and each configured for providing a specified service, a selected server for providing the specified service for a client device at a network-based client location. The selection resource selects the selected server based on the corresponding server location relative to the client location, and causes a request having been generated by the client device to be sent to the selected server. Hence, the selection resource optimizes client-server interactions in a distributed computing network, based on the client location and the server location.

15 Claims, 6 Drawing Sheets

U.S. PATENT DOCUMENTS

| | | | |
|---|---|---|---|
| 6,714,519 B2 | 3/2004 | Luzzatti et al. | |
| 6,724,733 B1* | 4/2004 | Schuba et al. | 370/252 |
| 6,735,741 B1* | 5/2004 | Pannu | 715/234 |
| 6,738,813 B1* | 5/2004 | Reichman | 709/224 |
| 6,810,411 B1* | 10/2004 | Coughlin et al. | 709/203 |
| 6,978,447 B1* | 12/2005 | Okmianski | 717/139 |
| 7,016,682 B2* | 3/2006 | Won et al. | 455/445 |
| 7,020,698 B2 | 3/2006 | Andrews et al. | |
| 7,043,563 B2* | 5/2006 | Vange et al. | 709/245 |
| 7,143,169 B1* | 11/2006 | Champagne et al. | 709/226 |
| 7,254,626 B1 | 8/2007 | Kommula et al. | |
| 7,310,686 B2* | 12/2007 | Uysal | 709/245 |
| 7,343,422 B2 | 3/2008 | Garcia-Luna-Aceves et al. | |
| 7,571,232 B2* | 8/2009 | Zigmond et al. | 709/227 |
| 2001/0025313 A1* | 9/2001 | Feng et al. | 709/226 |
| 2001/0051955 A1* | 12/2001 | Wong | 707/201 |
| 2002/0038360 A1* | 3/2002 | Andrews et al. | 709/223 |
| 2002/0049842 A1* | 4/2002 | Huetsch et al. | 709/225 |
| 2002/0087707 A1* | 7/2002 | Stewart et al. | 709/230 |
| 2002/0161718 A1* | 10/2002 | Coley et al. | 705/59 |
| 2002/0169890 A1* | 11/2002 | Beaumont et al. | 709/245 |
| 2002/0198961 A1* | 12/2002 | Krishnamurthy et al. | 709/217 |
| 2002/0199014 A1* | 12/2002 | Yang et al. | 709/238 |
| 2003/0002484 A1* | 1/2003 | Freedman | 370/352 |
| 2003/0101278 A1* | 5/2003 | Garcia-Luna-Aceves et al. | 709/240 |
| 2003/0208563 A1* | 11/2003 | Acree et al. | 709/219 |
| 2003/0225873 A1* | 12/2003 | Wade | 709/223 |
| 2004/0103194 A1* | 5/2004 | Islam et al. | 709/225 |
| 2004/0264385 A1* | 12/2004 | Hennessey et al. | 370/252 |
| 2004/0267930 A1* | 12/2004 | Giulio et al. | 709/225 |
| 2006/0031393 A1* | 2/2006 | Cooney et al. | 709/217 |
| 2006/0053415 A1* | 3/2006 | Okmianski | 717/139 |
| 2006/0089935 A1* | 4/2006 | Clifford et al. | 707/10 |
| 2006/0130064 A1* | 6/2006 | Srivastava | 718/102 |
| 2006/0179431 A1* | 8/2006 | Devanathan et al. | 717/168 |
| 2006/0224725 A1* | 10/2006 | Bali et al. | 709/224 |
| 2007/0018630 A1* | 1/2007 | Oehm | 323/313 |

OTHER PUBLICATIONS

U.S. Appl. No. 09/908,578, filed Jul. 20, 2001, Turner.
U.S. Appl. No. 11/049,559, filed Feb. 2, 2005, Turner et al.
U.S. Appl. No. 11/134,336, filed May 23, 2005, Toebes et al.
Mockapetris, "Domain Names—Concepts and Facilities", Network Working Group, Request for Comments: 1034, Nov. 1987.
Mockapetris, "Domain Names—Implementation and Specification", Network Working Group, Request for Comments: 1035, Nov. 1987.
Gulbrandsen et al., "A DNS RR for specifying the location of services (DNS SRV)", Network Working Group, Request for Comments: 2782, Feb. 2000.
Calhoun et al., "Diameter Base Protocol", Network Working Group, Request for Comments: 3588, Sep. 2003.
Yokota et al., "A Proposal of DNS-Based Adaptive Load Balancing Method for Mirror Server Systems and Its Implementation", 18$^{th}$ International Conference on Advanced Information Networking and Applications (AINA '04) vol. 2, Mar. 29-31, 2004, pp. 1-6, Fukuoka, Japan.
Butte, "Solving the data warehouse dilemma with grid technology", IBM Global Services, Aug. 2004.
Joseph et al., "Evolution of grid computing architecture and grid adoption models", *IBM Systems Journal*, vol. 43, No. 4, 2004, pp. 624-645.
Bourbonnais et al, "Towards an information infrastructure for the grid", *IBM Systems Journal*, vol. 43, No. 4, 2004, pp. 665-688.
Anderson et al, "Global namespace for files", *IBM Systems Journal*, vol. 43, No. 4, 2004, pp. 702-722.
Tan et al., "Service domains", *IBM Systems Journal*, vol. 43, No. 4, 2004, pp. 734-755.
Lewis et al, "MyMED: A database system for biomedical research on MEDLINE data", *IBM Systems Journal*, vol. 43, No. 4, 2004, pp. 756-767.
Peterson et al., "A Blueprint for Introducing Disruptive Technology into the Internet", *PLANETLAB*PDN-02-01, Jul. 2002.
"Dynamic Domain Name Service", DyDNS, <http://www.dyns.com/services/services.htm>, Nov. 2, 2004.
"Linksys and Tzolkin Corporation Team-Up to Bundle TZO Dynamic DNS Service with Linksys' Top-Selling Cable/DSL Routers", Linksys, http://www.linksys.com/press/press.asp?prid=31>, Nov. 2, 2004.
Sheldon, "Domains in Windows NT", Encyclopedia of Networking, Electronic Edition, 1998, 6 pages, Osborne/McGraw-Hill, Berkeley, CA.
Lottor, "Domain Administrators Operations Guide", Network Working Group, Request for Comments: 1033, Nov. 1987, pp. 1-22.
Francis, et al., "IDMaps: A Global Internet Host Distance Estimation Service", [online], Oct. 2001, [retrieved on Aug. 10, 2009]. Retrieved from the Internet: <URL: http:www.eng.tau.ac.il/~shavitt/pub/ToM01IDMaps.pdf>, IEEE/ACM Transactions on Networking, vol. 9, No. 5, pp. 525-540.
Agarwal, et al., "Matchmaking for Online Games and Other Latency-Sensitive P2P Systems", [online], Aug. 1, 2009, [retrieved on Aug. 13, 2009]. Retrieved from the Internet: <URL: http://ccr.sigcomm.org/online/files/p315.pdf>, SIGCOMM '09, Aug. 17-21, 2009, Barcelona, Spain, pp. 315-326.

\* cited by examiner

ARRANGEMENT FOR SELECTING A SERVER TO PROVIDE DISTRIBUTED SERVICES FROM AMONG MULTIPLE SERVERS BASED ON A LOCATION OF A CLIENT DEVICE

This application is a continuation of copending application Ser. No. 11/081,694, filed Mar. 17, 2005, which is a continuation-in-part of commonly-assigned, copending parent application Ser. No. 11/000,041, filed Dec. 1, 2004, entitled "ARRANGEMENT IN A SERVER FOR PROVIDING DYNAMIC DOMAIN NAME SYSTEM SERVICES FOR EACH RECEIVED REQUEST", the disclosure of which is incorporated in its entirety herein by reference.

BACKGROUND OF THE INVENTION

1. Field of the Invention

The present invention relates to identifying a server to provide a client device a distributed service, the server selected from among a plurality of distributed servers based on a locality of the client device.

2. Description of the Related Art

Distributed services such as Web-based search engines, for example the search site offered by Google® on the World Wide Web having the domain name "google.com", are based on execution of the distributed services by distributed servers, also referred to as grid computing, where the distributed servers are configured for distributing the load associated with providing the distributed services. In particular, a client browser that attempts to access the Web service at the domain name "google.com" will be directed randomly to one of the distributed servers to ensure an even load-balancing among the servers. Load balancing is described in further detail in the Internet Engineering Task Force (IETF) Request for Comments (RFC) 2782, and in the above-incorporated parent application. Other factors also may be used to direct a client browser to a given server; a client browser may be directed to the previously-used server if the client browser previously accessed Web-based e-mail, in order to enable the utilization of user data having been transferred to the previously-used server.

In addition, distributed services such as web-based search services may be offered by a provider such as Google® based on worldwide distribution of data centers, where each data center has its own corresponding set of distributed servers for providing the corresponding distributed service. In particular, worldwide distribution of data centers solves the problem of worldwide propagation delays that otherwise would be encountered due to the propagation limitations to the speed of light and speed of data signals through optical fiber and copper.

However, a given data center cannot be selected unless the user sends an HTTP request to the appropriate domain name: each data center is identified by its own corresponding domain name, for example based on a country-specific extension (e.g., ".uk", ".de", ".nz", ".jp") that identifies the country (e.g., United Kingdom, Germany, New Zealand, Japan) in which the corresponding data center resides; hence, a user in Japan could access the data center in Japan or United States based on entering the appropriate domain name "google.cojp" or "google.com", respectively. Conversely, a user in United States can access the data center in Japan simply by entering the appropriate domain name "google.cojp". Hence, there is no optimization of service or reduction in propagation delay if the user selects a distant domain name, for example a user in United States selecting the data center in Japan, since in this case the user would be directed to one of the servers in the Japan data center. Rather, a conventional domain name system (DNS) query would resolve the domain name having the country-specific extension to a specific IP address, in this case of a device located within the country.

Domain name system (DNS) servers, as described in the Internet Engineering Task Force (IETF) Request for Comments (RFC) 1034 and RFC 1035, are further described in detail in the above-incorporated parent application. In summary, a conventional DNS server may be configured for responding to a query by providing a prescribed resolution, or a list of prescribed resolutions. Each of the resolutions supplied by the DNS server are stored statically within (or local to) the DNS server, resulting in "prescribed" resolutions.

Hence, existing systems fail to provide any resolution for a given service that is based on attributes of the client device.

SUMMARY OF THE INVENTION

As described above, to date there has been no attempt at resolving a client query or request for a specified service by identifying any relationship between the server that is selected for a client device, and the location of the client device. In other words, there is no selection of a server from among multiple servers, for providing a distributed service for a client device, based on the location of the client device.

Hence, there is a need for an arrangement that enables a client device having requested a specified service to be directed to a selected one of multiple distributed servers, based on an identified network distance between the client device and the one selected server.

These and other needs are attained by the present invention, where a selection resource executed within the network is configured for selecting from among a plurality of servers, distributed throughout the network at respective network-based server locations and each configured for providing a specified service, a selected server for providing the specified service for a client device at a network-based client location. The selection resource selects the selected server based on the corresponding server location relative to the client location, and causes a request having been generated by the client device to be sent to the selected server. Hence, the selection resource optimizes client-server interactions in a distributed computing network, based on the client location and the server location.

One aspect of the present invention provides a method in a network node within a network. The method includes receiving by the network node a request for a specified service, the request having been sent by a client device, and identifying by the network node a network-based client location of the client device. The method also includes selecting by the network node one selected server from other servers, the one selected server and the other servers distributed throughout the network at respective network-based server locations and each configured for providing the specified service. The selecting is based on the server location of the one selected server relative to the client location. The method also includes causing the client device to reach the one selected server for the specified service.

Another aspect of the present invention provides method in a client device. The method includes identifying a network-based client location of the client device within a network relative to an identifiable network topology, and selecting by the client device one selected server from other servers, the one selected server and the other servers located at respective network-based server locations within the identifiable network topology and each configured for providing a client service. The selecting is based on the server location of the one selected server relative to the client location. The method also includes sending a request to the one selected server for the client service. Hence, the client device can direct its request to a selected server, from other servers located throughout the network, based on identifying the server location of the one selected server relative to the client location, optimizing the access of the client service by location-based selection of the most appropriate server.

Still another aspect of the present invention provides a network that includes a client device at a network-based client location within the network and configured for outputting a request for a specified service. The network also includes a plurality of servers distributed throughout the network at respective network-based server locations and each configured for providing the specified service. The network also includes a selection resource executed within the network and configured for selecting one of the servers as a selected server, from among the other servers, based on the corresponding server location of the selected server relative to the client location. The selection resource causes the request to be sent to the selected server for providing the specified service to the client device.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
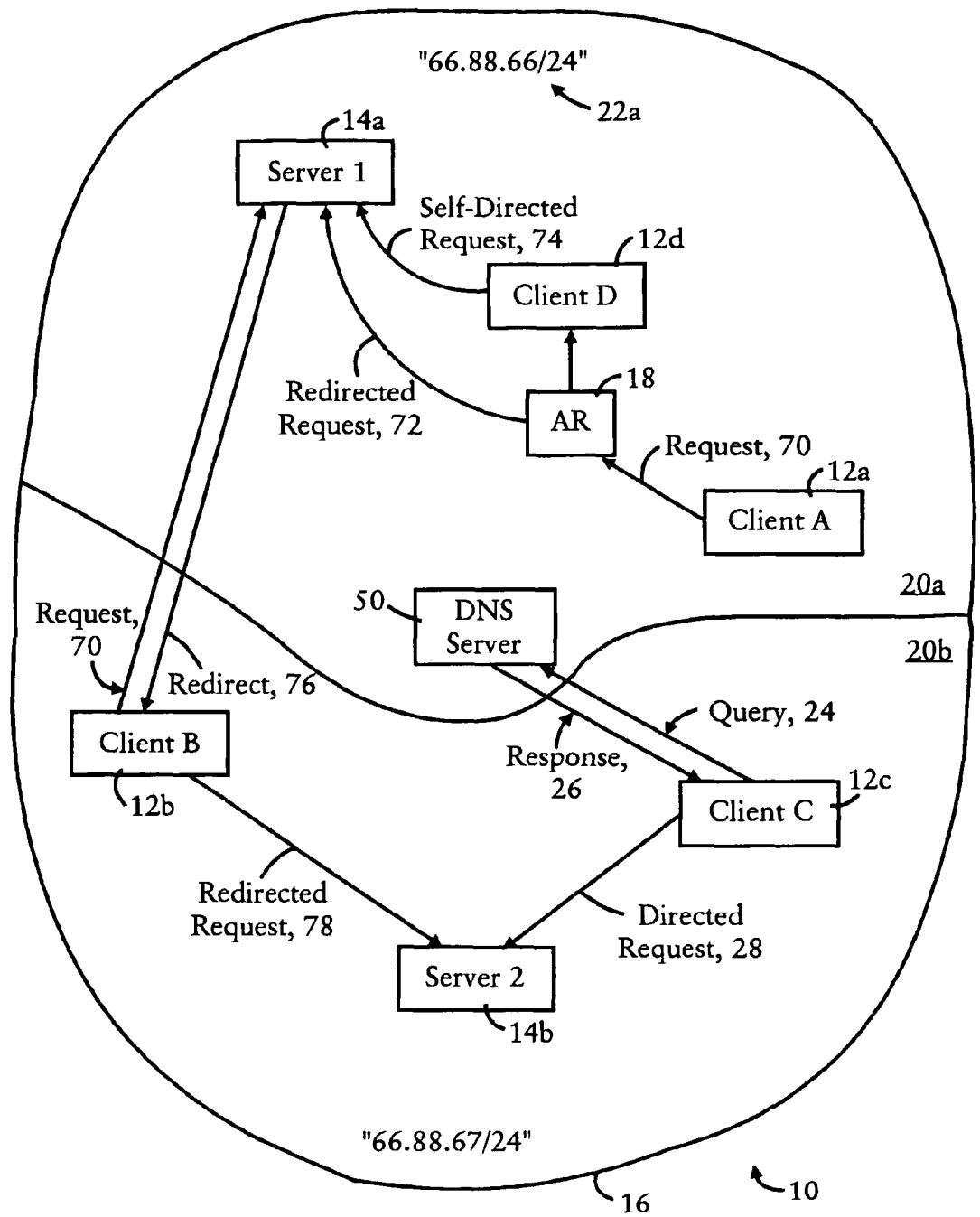
FIG. 1 is a diagram illustrating a distributed network having clients at respective client locations and multiple network nodes (e.g., servers) at respective server locations and configured for providing distributed client services, according to an embodiment of the present invention.

FIG. 1 is a diagram illustrating a network 10 having client devices 12 and distributed servers 14 for providing the clients 12 a specified distributed service, according to an embodiment of the present invention. The network 10 is illustrated in FIG. 1 as a topology map 16 having an identifiable network topology for identification of network nodes within the network. The network 10 also includes access routers 18, and at least one DNS server 50, described in detail in the above-incorporated parent application.

As described below, the topology map 16 illustrates a cost-based multidimensional space that positions network nodes (e.g., client devices 12, servers 14 and 50, access routers 18) relative to cost-based dimensions that identify a "network distance" between different locations within the topology. For example, the nodes 12a, 12d, 14a, 18 and 50 are positioned within the topology site 20a having the 24-bit IPv4 address prefix "66.88.66/24" 22a, for example based on their connectivity within a first local area network of the network 10, and the nodes 12b, 12c, and 14b are positioned within the topology site 20b having the 24-bit IPv4 address prefix "66.88.67/24" 22b based on their connectivity within a second local area network of the network 10, wherein the sites 20a and 20b can be connected by wide area network border routers (not shown). Although only one access router 18 is illustrated in FIG. 1, it will be appreciated that each client device 12 will be connected to a corresponding access router 18 in order to obtain access within the network 10. As apparent from the foregoing, the topology map 16 is intended to illustrate deployment of the network 10 in an enterprise-class network, for example a large-scale network deployed at a university or a multi-building office campus.

According to the disclosed embodiment, distributed services are implemented based on deploying multiple servers 14 throughout a network, each server 14 configured for providing the distributed service for any requesting client device. The distributed servers 14 can be implemented as distributed computing nodes as described in commonly-assigned, copending application Ser. No. 11/053,954, filed Feb. 10, 2005, entitled "Distributed Computing Based on Multiple Nodes with Determined Capacity Selectively Joining Resource Groups Having Resource Requirements", the disclosure of which is incorporated in its entirety herein by reference.

As described below with respect to FIGS. 4A and 4B, each requesting client device 12 is connected to one of the servers 14 having been identified as most appropriate for the requesting client device, for example the server closest to the client device. In particular, at least one network node within the network 10 includes a server selection resource, described below, configured for selecting one of the servers based on the corresponding server location relative to the client device.

As described in the above-incorporated parent application, one aspect of selecting the one server may involve sending a query by a client (e.g., 12c) to the DNS server 50, and receiving from the DNS server 50 a locality-based response 26 that enables the client 12c to send a directed request 28 to the distributed server (e.g., 14b) that has the minimum distance to the requesting client 12c.

The disclosed embodiment expands upon the teachings of the above-incorporated parent application by encompassing all variations in which a client device 12 is directed to a selected server (e.g., 14b) from among a group of distributed servers, based on the locality of the client device relative to the server. In particular, the disclosed embodiment expands on the dynamic domain name service of the DNS server 50 by providing functionality that enables a client device to be directed to the most appropriate server for any distributed service based on locality, where the direction can be performed based on execution of a server selection resource 40 by any one of the destination server (e.g., 14a), an intermediate node such as an access router 18, or the client device 12d.

Figure 2A:
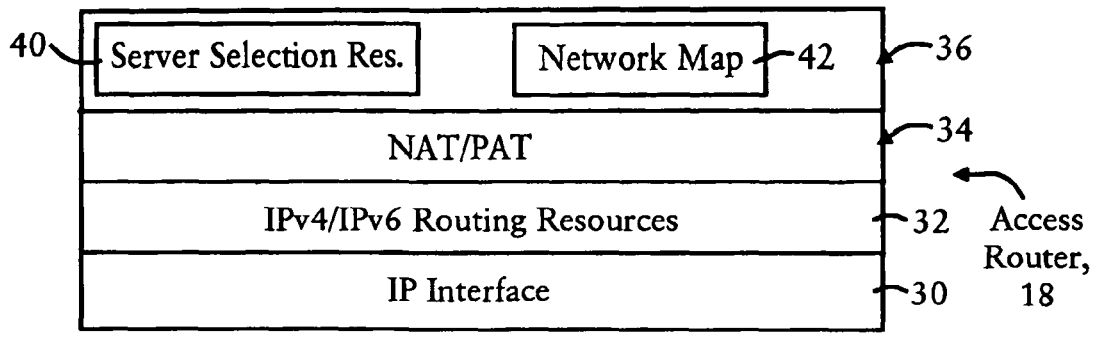
FIGS. 2A, 2B, and 2C are diagrams illustrating exemplary implementations of the selection resource within an access router, a distributed server, and a client device, respectively.
Figure 2B:
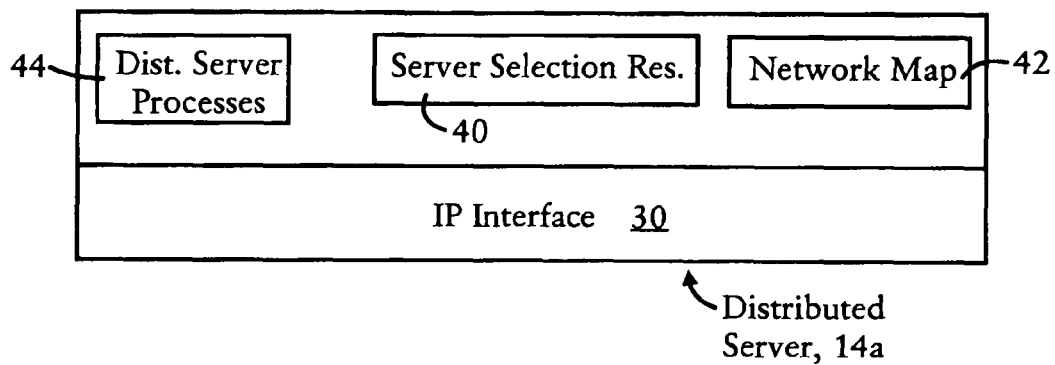
Figure 2C:
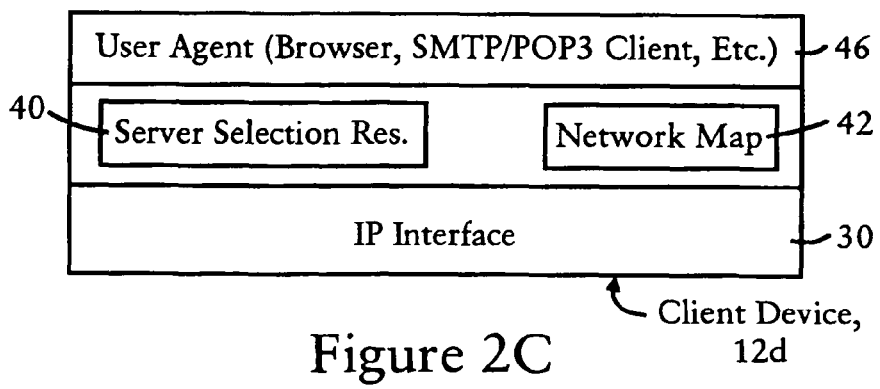
Figure 5:
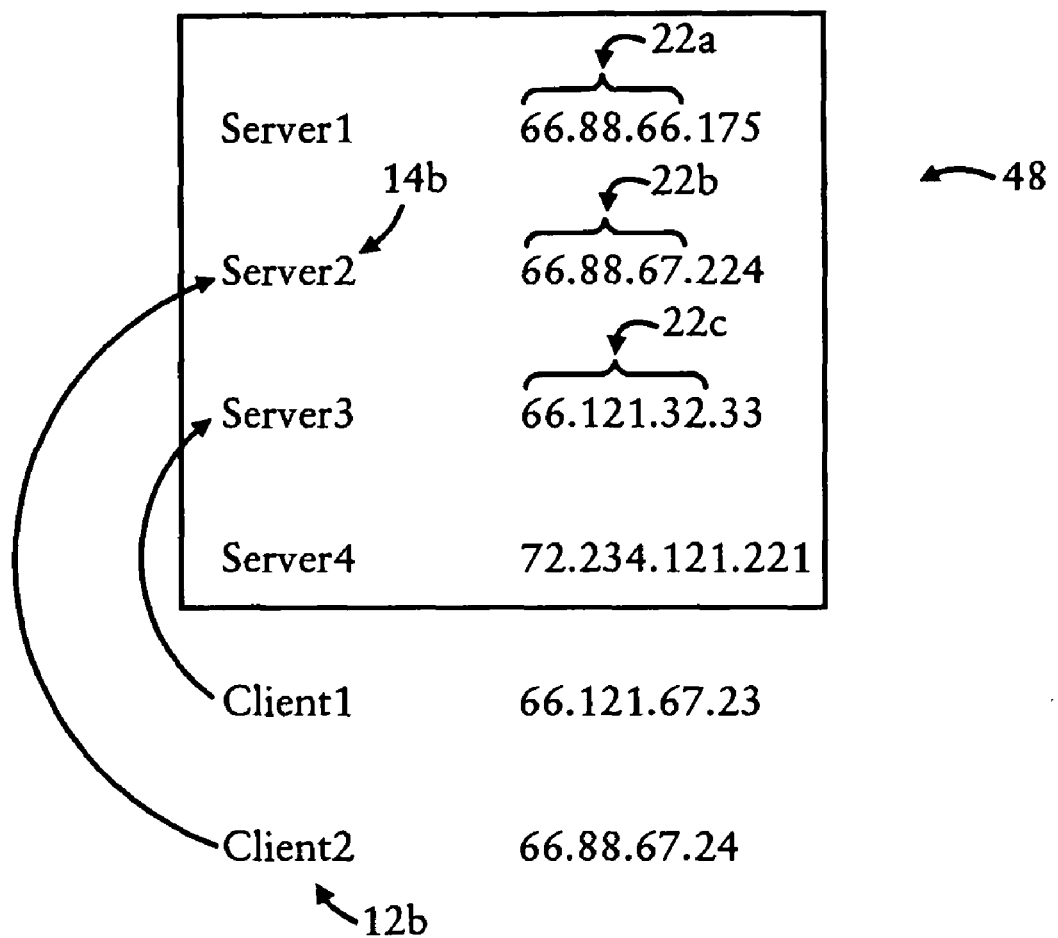
FIG. 5 is a diagram illustrating directing client devices to server locations based on subnet identifiers.

For example, FIG. 2A illustrates an access router 18 that includes an IP interface 30, routing resources 32, a network address translation/protocol address translation (NAT/PAT) layer 34, and an application level gateway layer 36. The application level gateway layer 36 includes a server selection resource 40 and at least a portion of the network topology map 16 stored as a stored network map 42. FIG. 2B illustrates a distributed server (e.g., 14a) that includes an IP interface 30, the server selection resource 40, the network map 42, independent of existing distributed service processes 44 that provide the requested client services. Similarly, FIG. 2C illustrates an intelligent client device 12d that inherently includes a processor (e.g., a central processing unit); the client device 12d further includes not only an executable user agent 46 (e.g., an e-mail client or HTTP browser) and an IP interface 30, but also includes the server selection resource 40 and the network map 42. Although the network map 42 is described as at least a portion of the network topology map 16, as apparent from the description below the selection resource 40 also may utilize a stored table 48 of server IP addresses, illustrated in FIG. 5, to identify the nearest server based on the requesting client device and the nearest server sharing an address prefix 22.

Figure 3:
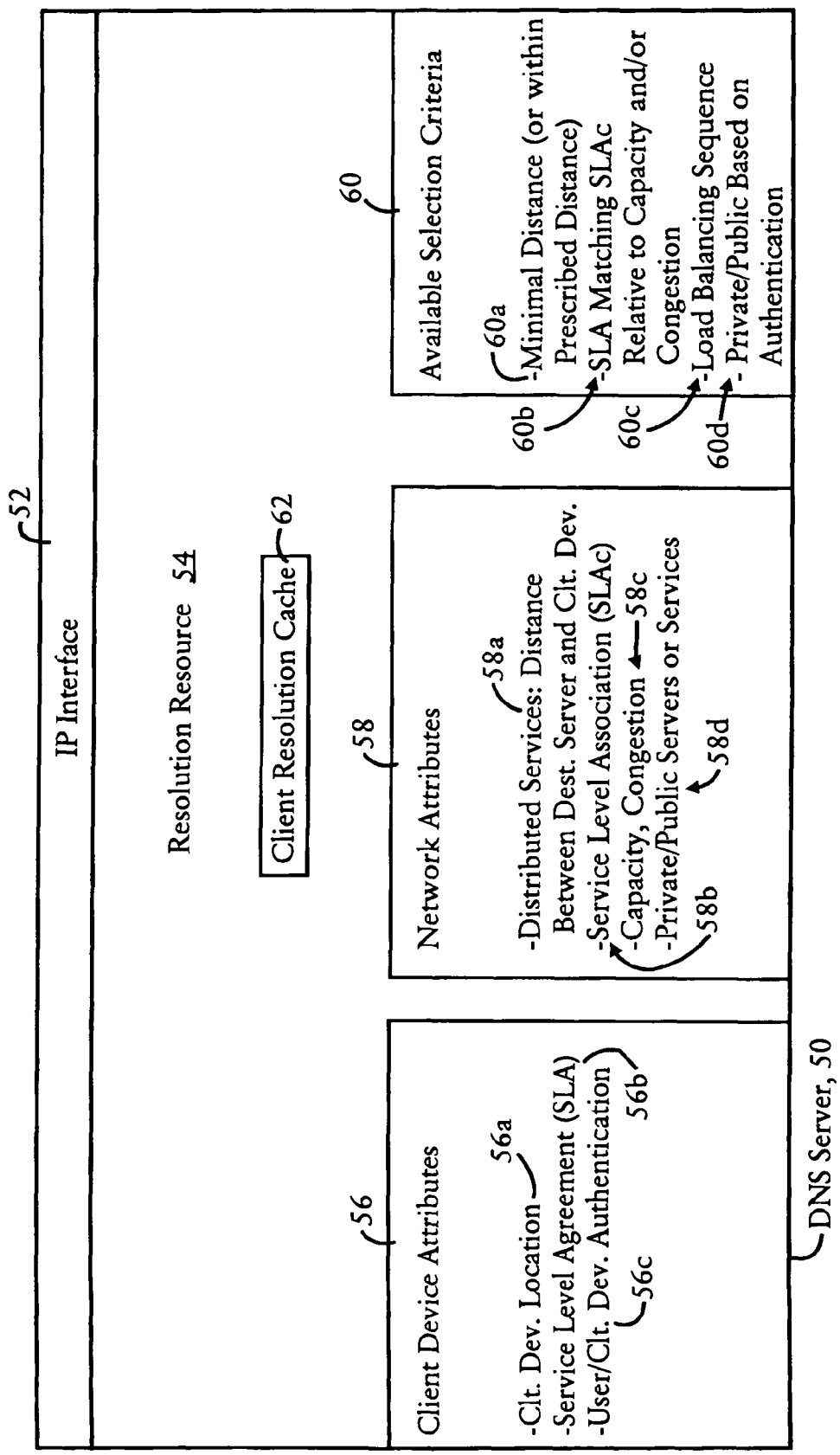
FIG. 3 is a diagram illustrating a DNS server according to an embodiment of the present invention.

FIG. 3 is a diagram illustrating a Domain Name System (DNS) server 50, according to an embodiment of the present invention. The DNS server 50 includes an IP interface 52, and a resolution resource 54. The IP interface 52 is configured for receiving, via a network, a DNS request from a client device (e.g., 12c of FIG. 1). The DNS request from the client device includes typically the IP address of the client device, and a specified service. Hence, the DNS request is for at least one destination that provides within the network the specified service.

The resolution resource 54 is configured for receiving the DNS request from the EP interface 52, and dynamically selecting a resolution, or a list of resolutions, that satisfies the DNS request. Unlike prior DNS servers, however, the resolution resource 54 does not merely retrieve stored resolutions. Rather, the resolution resource 54 dynamically selects a selected resolution in order to identify a destination that is most appropriate for the client device.

According to the disclosed embodiment, the resolution resource 54 is configured for dynamically selecting, for the client device, a selected resolution from a plurality of available resolutions. In particular, the resolution resource 54 includes a client device attributes module 56 configured for identifying client device attributes, a network attributes module 58 configured for identifying network attributes, and an available selection criteria module 60 configured for identifying criteria available for selecting a resolution from available resolutions. The resolution resource 54 also includes a client resolution cache 62. As described in further detail below, the resolution resource 54 is configured for dynamically selecting a selected resolution for the DNS query based on applying client device attributes 56 and/or network attributes 58 to the available selection criteria 60 in order to dynamically select a resolution.

Consequently, the resolution resource 54 applies available selection criteria 60 to available client device attributes 56 and/or network attributes 58 in order to identify a selected resolution which is the "most appropriate" for the client device. It will become readily apparent that numerous selection criteria and attributes may be utilized in identifying the most appropriate resolution for a given client device; hence, the description herein with respect to different attributes and selection criteria are only by way of illustration, and are not intended to limit the disclosed embodiment to any attributes or selection criteria.

For example, the client device attributes module 56 may identify attributes such as client device location 56a, service level agreement (SLA) 56b, or user/client device authentication 56c. The client device location attribute 56a may be particularly relevant in identifying the closest server relative to the client device location; the service level agreement (SLA) attribute 56b may be relevant in distinguishing different service types or destinations based on service-level agreement, where a user having subscribed to a premium service may be granted access to a higher capacity destination server, as opposed to a subscriber with a minimal service agreement being limited to limited-capacity destination servers.

In addition, the user or client device authentication attribute 56c may be relevant with respect to corporate or relationship-based services in terms of directing a client device to an external destination (i.e., external to a corporate intranet) or an internal destination (i.e., internal to the corporate intranet), based on whether the client device and the destination service have an established trust relationship. Additional details illustrating location-based services are illustrated, for example, in commonly-assigned, copending application Ser. No. 09/908,578, filed Jul. 20, 2001, entitled "INTEGRATION OF PRESENCE SERVICES WITH A NETWORK ENABLED TELEPHONY DEVICE", the disclosure of which is incorporated in its entirety herein by reference.

The network attributes module 58 identifies the network-based characteristics utilized by the resolution resource 54 in identifying a destination for the specified service that is most appropriate for the client device issuing the DNS request. For example, in the case of distributed services, the distance attribute 58a identifies distance between a destination server and a client device (based on the client device location attribute 56a) to identify a minimal distance. The term "distance" as used herein with respect to the distance attribute 58a and the distance obtained based on the network topology map 16 of FIG. 1 can refer to attributes of the network, which are detectable by the elements of the network, that establish a quantifiable relationship, for example hop count, latency, bandwidth, lost packets, line noise, congestion, wireless signal strength, supplied GPS coordinates, etc.

In particular, the network topology-based coordinates may include bandwidth, throughput, hop count, round-trip time delay, the cost of accessing data, etc., and any other attributes that quantify the relative ability (i.e., "network distance") to move data to and from another machine based on a comparison of the respective coordinates of the source and destination machines. Hence, the network distance between two nodes identifies the relative ability to move data between the two nodes. Additional details related to the use of topology-based coordinates to determine a network distance are described in commonly-assigned, copending application Ser. No. 11/049, 559, filed Feb. 2, 2005, entitled "TECHNIQUES FOR LOCATING DISTRIBUTED OBJECTS ON A NETWORK BASED ON PHYSICAL COMMUNICATION COSTS," the disclosure of which is incorporated in its entirety herein by reference.

In addition, the Service Level Association (SLAc) attribute 58b may be relevant in associating a given service level for the client device 56b with the corresponding server providing the specified service in the network. The capacity and congestion attribute 58c also may be relevant in identifying associated network conditions of relevant network components for selection criteria based on performance relative to a service-level agreement, load-balancing, or identifying destinations that need to be relieved of demand for service due to encountered congestion conditions. The private/public servers or services attribute 58d identifies whether a given network resource is considered publicly available on the public Internet or privately available within a restricted site (e.g., a corporate intranet).

The available selection criteria module 60 is configured for identifying the various policies that may be implemented by the resolution resource 54. For example, the available selection criteria may include identifying the minimal distance 60*a* between a client device location attribute 56*a* and a distributed services attribute 58*a*. In addition, the available selection criteria may include a match 60*b* between the SLA 56*b* of the client device and the SLAc 58*b* of a given network resource. In addition, the matching of the SLA 56*b* and the SLAc 58*b* according to the selection criterion 60*b* also may be relative to the capacity or congestion attribute 58*c* of the corresponding network resource.

Another selection criterion that may be used involves a load-balancing sequence 60*c*, where the resolution resource 54 selects available resolutions in a prescribed sequence (e.g., round-robin, weighted round-robin, or weighted random selection as illustrated in FIG. 2) in order to control access by client devices to distributed servers according to a prescribed load balancing policy.

Another available selection criterion includes identifying a public or private destination 60*d* based on authentication of the user or client device authentication attribute 56 relative to the public or private attributes 58*d* of the available servers or services.

Hence, the resolution resource 54 can be configured for selecting the selected resolution based on the location attribute 56*a* of the client device within the network, for example using a minimal distance selection criterion 60*a* (or within a prescribed distance) relative to a given destination server distance attribute 56*a* in a distributed services platform. Moreover, the distance selection criterion 60*a* and the service level matching selection criterion 60*b* may be combined in order to provide optimized locality selection for premium subscribers, and less than optimized locality-based selection of a destination server for a service-level agreement 56*b* specifying an economic or minimal subscription rate. Alternately, capacity-based selection criteria or authentication-based selection criteria may be used in order to identify the destination that is most appropriate for the client device based on load balancing, trusted relationships, etc.

As apparent from the foregoing, the resolution or list of resolutions may specify either an explicit IP address, or another host name for a secondary DNS server configured for providing more specific resolutions based on a different set of criteria. Multi-tiered resolutions may be deployed, where a first DNS server 50 directs the client device to a second DNS server (not shown) based on authentication (or SLA validation) of the client device; the second DNS server can then direct the client device to the appropriate destination based on locality, load sharing, etc. Hence, a first DNS server 50 may be accessed for validation of a service-level agreement attribute 56*b* or a client device authentication 56*c*; based on the validation of the client device, the DNS server 50 may direct the client device to another DNS server 50 (not shown) configured for identifying the destination server for an authenticated client device, for example based on locality or load distribution.

The disclosed embodiment contemplates that any one of the resources of the DNS server 50 may be implemented within the selection resource 40 illustrated in FIGS. 2A-2C, enabling the locality-based server selection to be fully distributed among any node in the network 10. At a minimum, however, the selection resource 40 will select a server for providing a client service based on the distance between the network-based server location and the network-based client location, and the availability of the server. Hence, load distribution can still be employed to enable a client device to access the nearest server that is not overloaded.

Figure 4A:
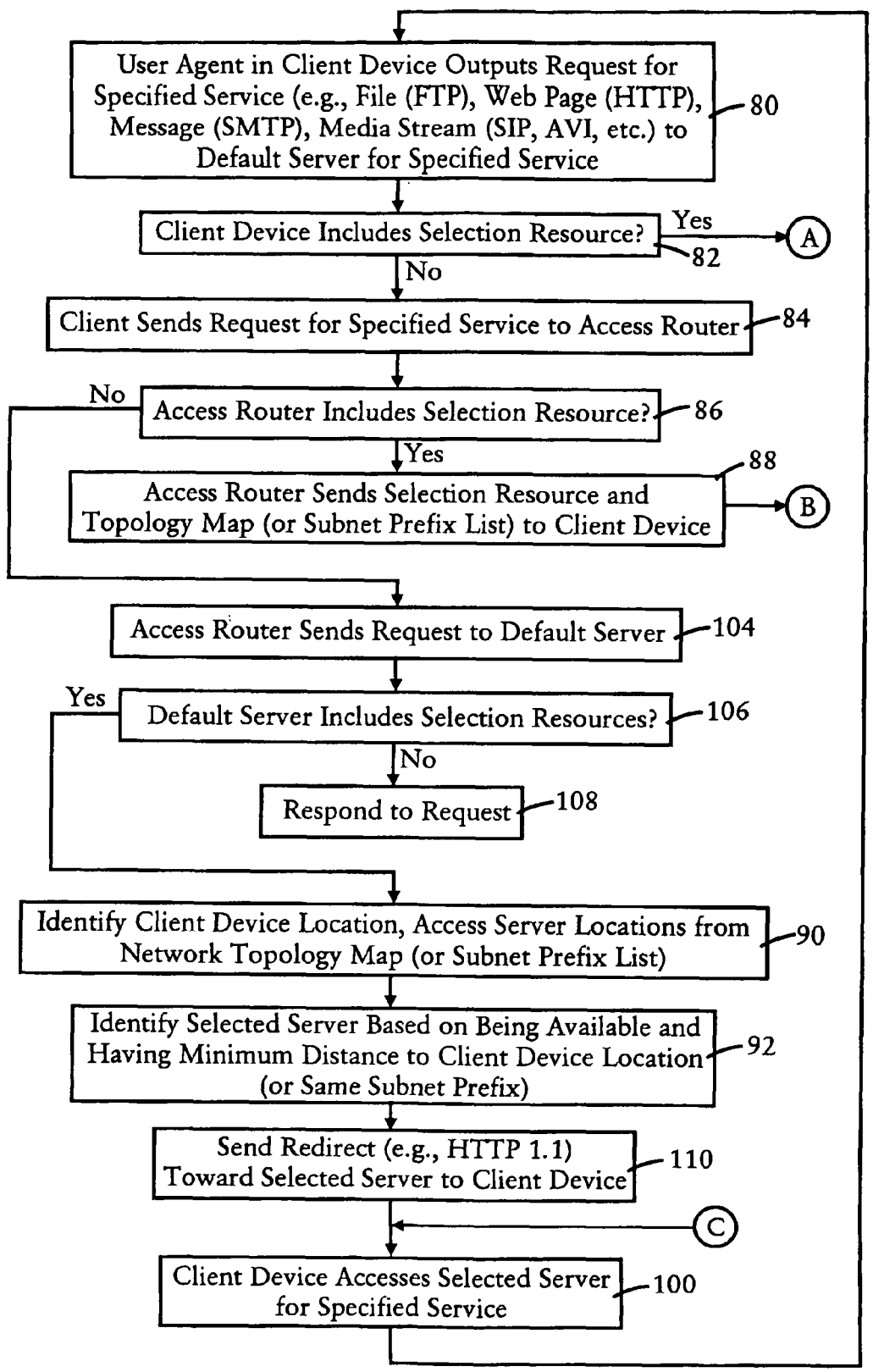
FIGS. 4A, 4B and 4C are diagrams summarizing the method of directing a client request to a selected server, based on the client location and the server location, according to an embodiment of the present invention.
Figure 4B:
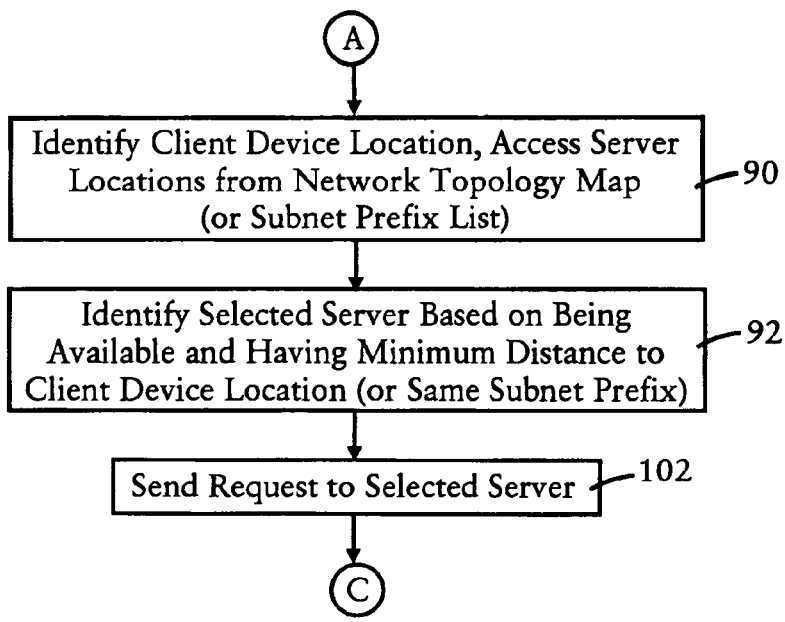
Figure 4C:
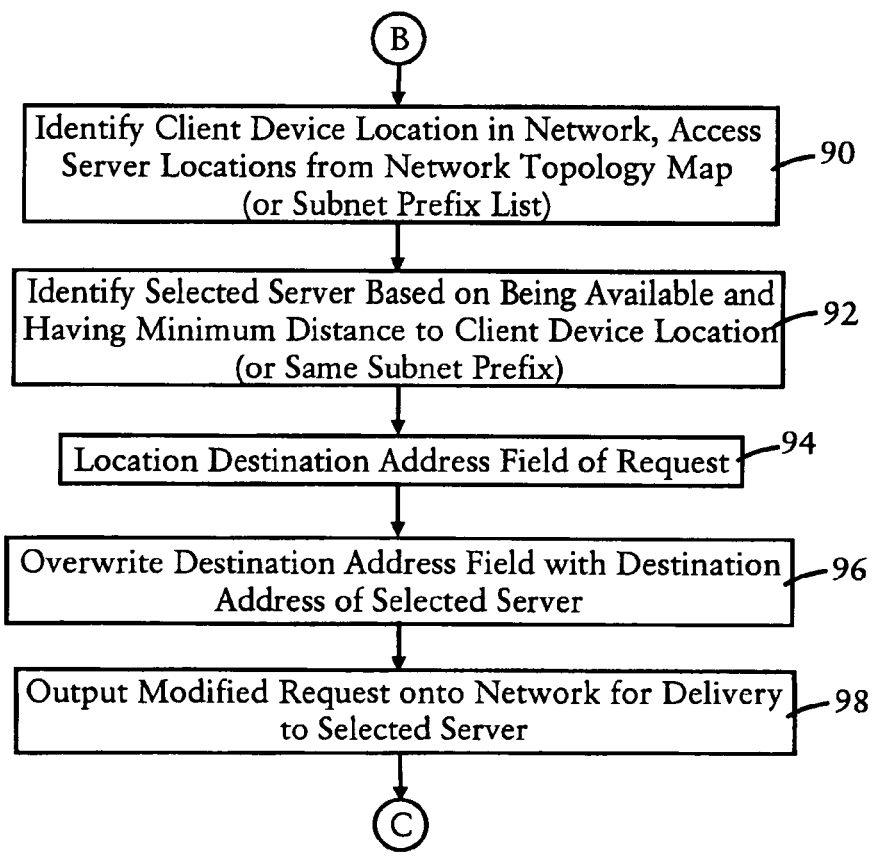

FIGS. 4A, 4B and 4C are diagrams summarizing the method of selecting a distributed server 14 for providing a service to a client device 12, based on the corresponding server location in the client location, according to an embodiment of the present invention. The steps described herein with respect to FIGS. 4A, 4B and 4C can be implemented as executable code stored on a computer readable medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

The method begins in step 80, where a user agent 46 executed by client device (e.g., client device 12*a*) outputs a request 70 for a specified service. The specified service may be for any type of network-based distributed service, for example a file transfer service according to the FTP protocol, a request for a file using a network-based file system, and HTTP based web request, a message request (e.g., according to SMTP protocol), or initiation of a media stream (e.g., a Voice over IP-based SIP connection, a multimedia (AVI) stream, etc.). If in step 82 the client device (e.g., 12*a*) having output the request does not have the selection resource 40, the IP interface 30 of the client device 12 sends the request 70 in step 84 to its access router 18.

Assuming in step 86 that the access router 18 includes the selection resource 40, the access router 18 sends in step 88 the selection resource 40 and the network topology map 42 to the client device 12 in order to enable the client device to perform its own selection for subsequent requests, described below with respect to FIG. 4B.

FIG. 4C is a diagram illustrating in further detail the steps by the selection resource 40 executed by the access router 18. The request 70 is received by the IP interface 30 and sent to the routing resource 32: in response to detecting that the request 70 specifies a service recognized as being provided by the distributed servers 14, the request is passed to the application-level gateway 36. The selection resource 40 in the access router 18 identifies in step 90 the client device location and the server locations within the network 10, for example based on retrieval of the network map 42 that includes at least a portion of the network topology map 16, or alternately based on retrieving the address table 48 of FIG. 5.

The selection resource 40 identifies in step 92 one of the servers as the one selected server to be used for providing the specified service, based on determining that the one selected server (e.g., 14*a*) has the minimum distance to the client device location. The selection resource 40 in the access router 18 locates in step 94 the destination address field of the request 70, and overwrites in step 96 the destination address field with the destination address of the one selected server (e.g., 14*a*). The selection resource 40 outputs in step 98 the modified request for transmission by the IP interface 30 as a redirected request 72 to the selected server (e.g., 14*a*), enabling the closest server to be utilized for providing the specified service in step 100 of FIG. 4A.

Hence, implementing the selection resource 40 within the access router 18 provides the advantage of minimizing unnecessary traffic within the network 10, by redirecting client requests 70 into redirected requests 72 in order to obtain services from the nearest distributed server. As described above with respect to step 88, efficiency can be further improved based on the client device executing the selection resource 40.

Hence, assuming in step 82 that the client device (e.g., 12*d*) includes the selection resource 40, the selection resource 40 executed within the client device 12*d* identifies the client device location in the network 10, and the server locations from the network topology map 42 (for calculation of network distance in the identifiable network topology) or the subnet prefix list 48, illustrated as step 90 in FIG. 4B. The selection resource 40 executed within the client device 12*d* also identifies the selected server based on the server being available and having the minimum distance to the client device location, or having the same subnet prefix 22. Hence, the steps 90 and 92 illustrated in FIG. 4B and executed by the selection resource 40 in the client device 12*d* are the same as the steps 90 and 92 performed by the access router 18 in FIG. 4C. In this case, the self-directed request 74 is output to the selected server (e.g., 14*a*) in step 102.

As described above, the selection resource 40 also can be implemented in any one of the distributed servers 14. Referring to FIG. 4A, if in step 86 neither the access router 18 nor the client device 12 (e.g., 12*b*) include the selection resource 40, the access router 18 sends the request 70 to the default server (e.g., 14*a*) in step 104. If in step 106 the default server specified in the request 70 does not include the selection resource 40, the server can respond in step 108 to the request 70 in a conventional manner.

Assuming in step 106 that the default server (e.g., 14*a*) includes the selection resource 40, the selection resource 40 executed in the server 14*a* performs the same selection operations described above with respect to FIGS. 4B and 4C, namely identifying the client device location and the respective server locations from the network topology map 42 or the subnet prefix list 48 in step 90, and identifying the selected server (e.g., 14*b*) that is available a having the minimum distance to the client device location (or having the same subnet prefix 22) in step 92. The selection resource 40 outputs in step 110 a redirect request 76 back to the client device (e.g., 12*b*), causing the client device to output in step 100 a redirected request 78 to the selected server (e.g., 14*b*) for the selected service.

According to the disclosed embodiment, distributed services are implemented based on deploying multiple servers throughout a network, each server configured for providing the distributed service for any requesting client device. The requesting client device is connected to one of the servers having been identified as most appropriate for the requesting client device, for example the server closest to the client device.

The disclosed embodiment can be applied to Active Directory used by Microsoft®, or SAP based solutions (additional information regarding SAP based solutions are described at on the World Wide Web at the website having the domain name "sap.com"). In addition, an application level gateway could be modified to implement the disclosed features of selecting a server based on the location of the client device. In particular, an application level gateway is executed on a gateway device and provides a proxy for a service; hence, if a client device accesses the application level gateway for a prescribed distributed service, the application level gateway will direct the client device to another server based on the location of the client device.

Hence, any resource that finds a server for a client in order to provide service for that client can be implemented to provide the locality-based selection described herein. Consequently, an access router can implement an application level gateway that will redirect a client device to the most appropriate server providing the distributed service, based on the location of the client device within the network; the access router can provide redirect services to the client device based on conventional NAT/PAT address translation that redirects the client device to the most appropriate server.

It will become readily apparent that numerous variations can be deployed within the scope of the claims, and that additional selection criteria can be added, as desired.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a client device, the method comprising:
   identifying by the client device a network-based client location of the client device within a network relative to an identifiable network topology;
   selecting by the client device one selected server from other servers, the one selected server and the other servers located at respective network-based server locations within the identifiable network topology and each configured for providing a client service, the selecting based on the client device identifying the server location of the one selected server in the identifiable network topology relative to the client location from one of a network topology map received by the client device or a subnet prefix list received by the client device, and based on the client device calculating the one selected server has at least one of the corresponding server location having a minimum network distance to the client location relative to the other servers, or a shared subnet prefix in an IP address of the one selected server; and
   sending a request by the client device via the network to the one selected server for the client service, wherein:
   the network-based client location is identified based on a corresponding network topology-based coordinate in the identifiable network topology;
   the corresponding server location of each of the one selected server and each of the other servers is based on a corresponding network topology-based coordinate in the identifiable network topology;
   the selecting including the client device determining, for each of the one selected server and each of the other servers, a corresponding network distance between the client device and the corresponding server based on comparing the respective network topology-based coordinates.

2. The method of claim 1, wherein the identifying includes receiving the one of the network topology map or the subnet prefix list from an access router in communication with the client device.

3. The method of claim 1, wherein the receiving includes receiving the network topology map, identifying the server locations and the client location within the identifiable network topology, for calculation of network distance in the identifiable network topology, the selecting of the one selected server based on the corresponding server location having the minimum network distance to the client location, relative to the respective server locations of others of the servers, and based on a determined availability of the one selected server.

4. The method of claim 1, wherein the selecting includes selecting the one selected server specified in the subnet prefix list based on the one selected server and the client device sharing the subnet prefix, the client location and the server location based on the subnet prefix.

5. The method of claim 1, wherein the client service is for any one of a file service, a web service, a message transfer service, or a media stream service.

6. A client device configured for connection with a network, the client device comprising:
a processor;
a selection resource configured for:
(1) identifying a network-based client location of the client device within the network relative to an identifiable network topology, and
(2) selecting one selected server from other servers, the one selected server and the other servers located at respective network-based server locations within the identifiable network topology and each configured for providing a client service, the selection resource configured for selecting the one selected server based on the selection resource in the client device identifying the server location of the one selected server in the identifiable network topology relative to the client location from one of a network topology map received by the client device or subnet prefix list received by the client device, and based on the selection resource calculating the one selected server has at least one of the corresponding server location having a minimum network distance to the client location relative to the other servers, or a shared subnet prefix in an IP address of the one selected server; and
a network interface configured for sending a request via the network to the one selected server for the client service, wherein the client device is a machine, wherein:
the network-based client location is identified based on a corresponding network topology-based coordinate in the identifiable network topology;
the corresponding server location of each of the one selected server and each of the other servers is based on a corresponding network topology-based coordinate in the identifiable network topology;
the selection resource configured for determining, for each of the one selected server and each of the other servers, a corresponding network distance between the client device and the corresponding server based on comparing the respective network topology-based coordinates.

7. The client device of claim 6, wherein the selection resource is configured for identifying the client location based on receiving the one of the network topology map or the subnet prefix list from an access router in communication with the client device.

8. The client device of claim 6, wherein the selection resource is configured for:
receiving the identifiable network topology as the network topology map, identifying the server locations and the client location, for calculation of network distance in the identifiable network topology, and
selecting the one selected server based on the corresponding server location having the minimum network distance to the client location, relative to the respective server locations of others of the servers, and based on a determined availability of the one selected server.

9. The client device of claim 6, wherein the selection resource is configured for selecting the one selected server specified in the subnet prefix list based on the one selected server and the client device sharing the subnet prefix, the client location and the server location based on the subnet prefix.

10. The client device of claim 6, wherein the client service is for any one of a file service, a web service, a message transfer service, or a media stream service.

11. A client device configured for connection with a network, the client device comprising:
a processor;
selection means for identifying a network-based client location of the client device within a network relative to an identifiable network topology, the selection means further configured for selecting one selected server from other servers, the one selected server and the other servers located at respective network-based server locations within the identifiable network topology and each configured for providing a client service, the selection means configured for selecting the one selected server based on the selection means in the client device identifying the server location of the one selected server in the identifiable network topology relative to the client location from one of a network topology map received by the client device or a subnet prefix list received by the client device, and based on the selection means calculating the one selected server has at least one of the corresponding server location having a minimum network distance to the client location relative to the other servers, or a shared subnet prefix in an IP address of the one selected server; and
a network interface configured for sending a request via the network to the one selected server for the client service, wherein the client device is a machine, wherein:
the network-based client location is identified based on a corresponding network topology-based coordinate in the identifiable network topology;
the corresponding server location of each of the one selected server and each of the other servers is based on a corresponding network topology-based coordinate in the identifiable network topology;
the selection means configured for determining, for each of the one selected server and each of the other servers, a corresponding network distance between the client device and the corresponding server based on comparing the respective network topology-based coordinates.

12. The client device of claim 11, wherein the selection means is configured for identifying the client location based on receiving the one of the network topology map or the subnet prefix list from an access router in communication with the client device.

13. The client device of claim 11, wherein the selection means is configured for:
receiving the identifiable network topology as the network topology map, identifying the server locations and the client location, for calculation of network distance in the identifiable network topology, and
selecting the one selected server based on the corresponding server location having the minimum network distance to the client location, relative to the respective server locations of others of the servers, and based on a determined availability of the one selected server.

14. The client device of claim 11, wherein the selection means is configured for selecting the one selected server based on the one selected server specified in the subnet prefix list and the client device sharing the subnet prefix, the client location and the server location based on the subnet prefix.

15. The client device of claim 11, wherein the client service is for any one of a file service, a web service, a message transfer service, or a media stream service.

* * * * *